Patented June 27, 1933

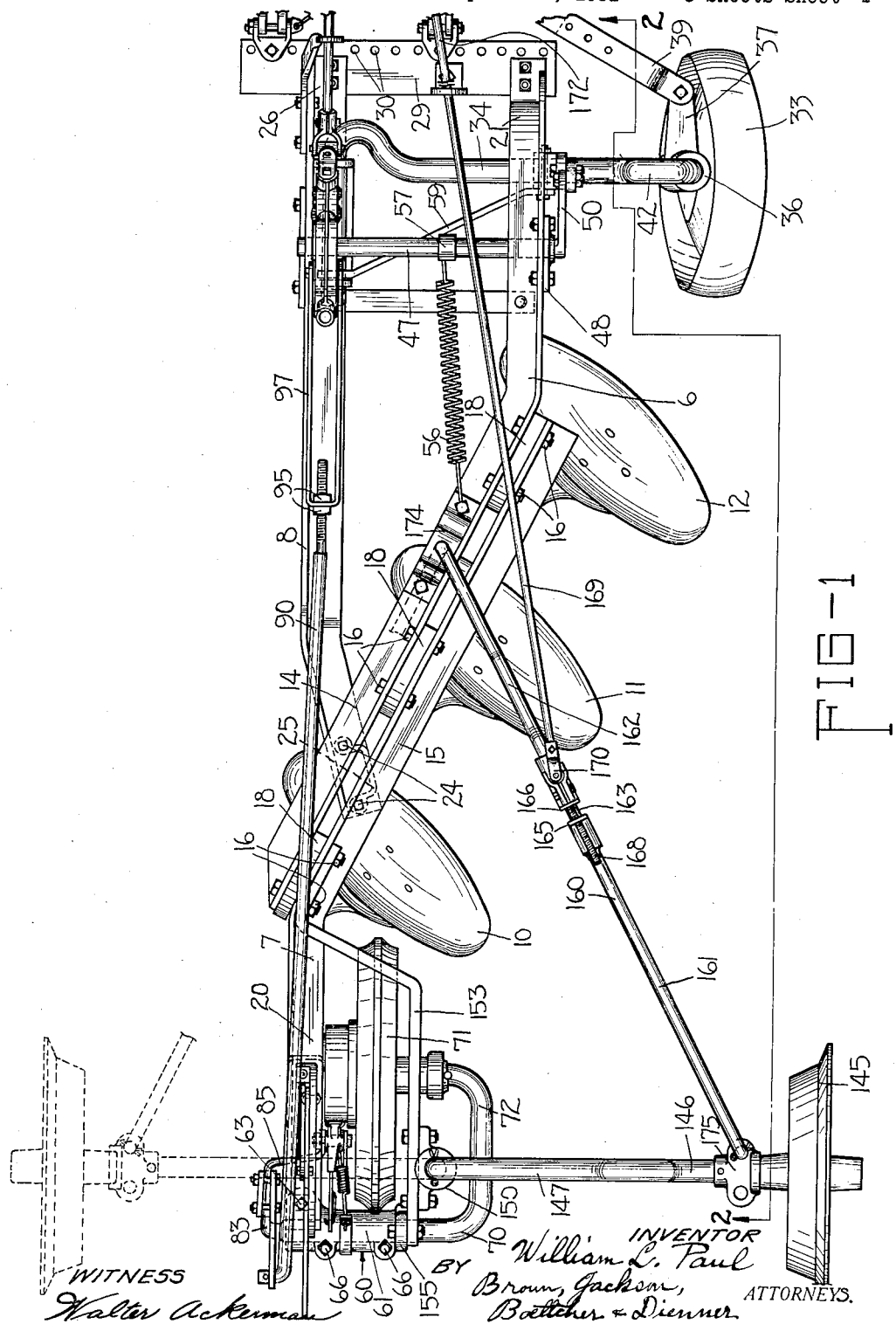

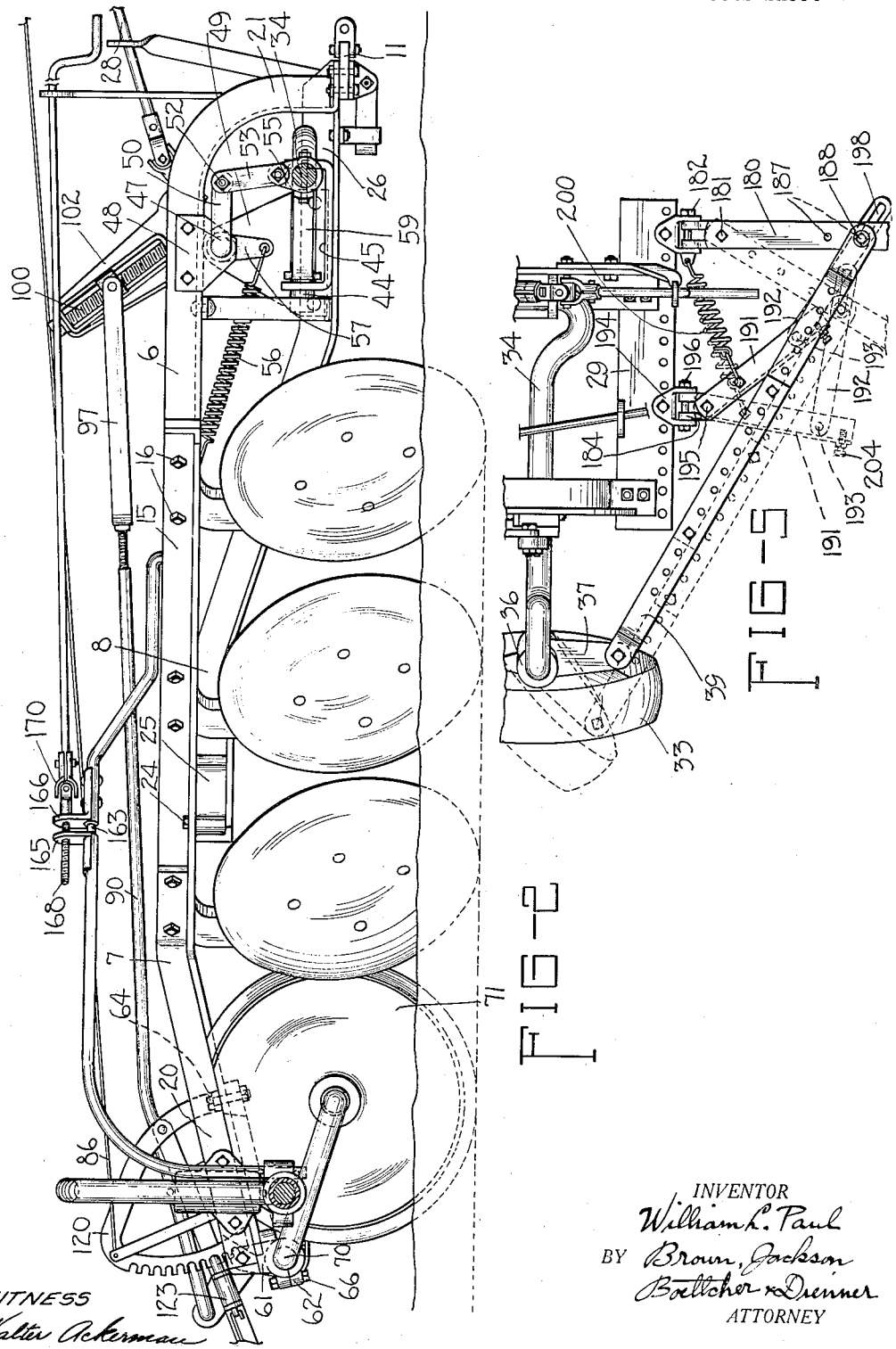

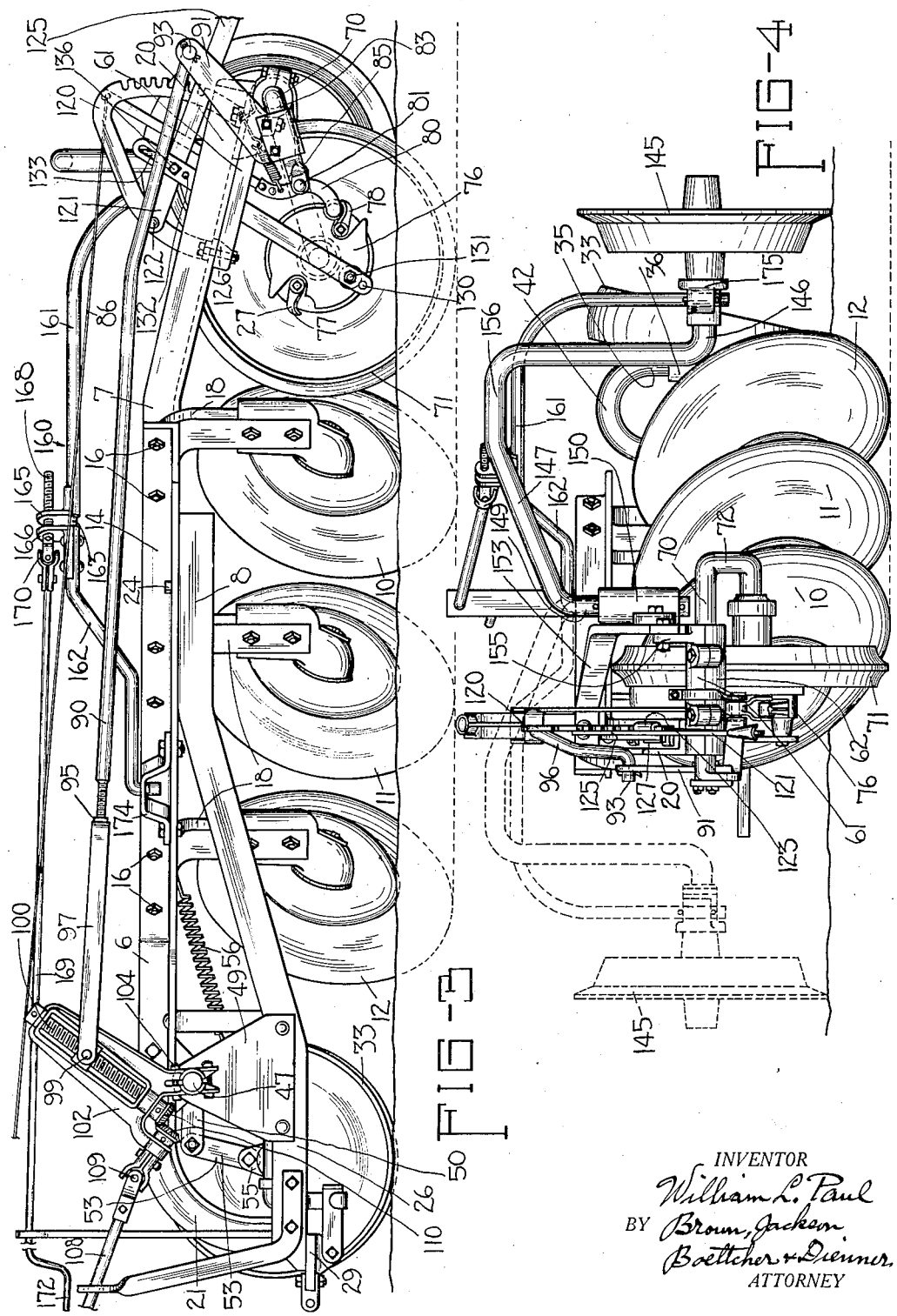

1,915,379

UNITED STATES PATENT OFFICE

WILLIAM L. PAUL, OF BERKELEY, CALIFORNIA, ASSIGNOR TO DEERE & COMPANY, OF MOLINE, ILLINOIS, A CORPORATION OF ILLINOIS

PLOW

Application filed April 27, 1931. Serial No. 533,095.

The present invention relates generally to agricultural implements and more particularly to a disk plow or similar cultivating tool which is so constructed and arranged to do effective work in close quarters or under other or similar conditions requiring the implement to be operated close up to obstructions and the like. In addition, the present invention also relates to certain improvements in the framework and wheeled supporting means therefor.

More specifically, one object of the present invention is to provide in a disk plow such a construction and arrangement of parts that the implement may be operated to throw soil up against the row of plants or away from them and, in both cases, to get as close to the rows with the plow as possible. The present invention, therefore, has particular utility in the type of agricultural implement known as an orchard plow or tiller which has the operating tools and the supporting wheels so constructed and arranged that the implement may be operated close to the rows of trees so as to cultivate and stir the soil up close to the trunks of the trees.

To accomplish this result one of the features of the present invention contemplates the provision of a rear supporting wheel which may be positioned at either side of the plow which, in connection with another rear plow supporting wheel mounted directly back of the soil engaging tools, permits the implement to be operated with the tools arranged to throw soil up against the trunks of the trees or away from them, the reversible wheel being mounted on one side or the other of the implement depending on which side of the plow runs next to the trees.

Another object of the present invention is the provision of improved front wheel supporting means which is intended to simplify the operation of securing proper depth adjustments and to so associate the parts that the frictional resistance customarily met with in effecting such adjustments is materially reduced.

In addition, it is the object of the present invention to provide a simplified and improved frame structure for such a disk plow, particularly one wherein the various connecting links and other operating parts are arranged in a low down position so that the plow may be conveniently operated under low overhanging limbs and the like.

Still further, another object of the present invention is the provision of an improved form of hitch for this and similar types of plows and other implements. In a disk plow there sometimes occurs a slight tendency for the front end of the plow, when operating under certain working conditions, to veer off to the left. My improved hitch connection is constructed and arranged to offset this tendency when it occurs while permitting the plow to be freely turned either to the right or to the left as may be desired.

While I have briefly outlined above some of the generic features of the present invention other objects and advantages will be apparent to those skilled in the art after a consideration of the following detailed description of a preferred structural embodiment, taken in conjunction with the accompanying drawings in which:

Figure 1 is a top plan view of an orchard disk plow illustrating the principal features of the present invention;

Figure 2 is a vertical elevation of the disk plow shown in Figure 1 corresponding to a view taken along the line 2—2 thereof and looking toward the right hand side of the plow;

Figure 3 is a vertical elevation looking toward the left hand side of the plow;

Figure 4 is a rear view showing the two positions of the reversible wheel; and

Figure 5 is a fragmentary top plan view showing my improved hitch connection mounted on the forward end of the plow shown in Figures 1 to 4.

Referring now more particularly to Figure 1, it will be seen that the main frame of the plow includes a plurality of frame members in the form of angle irons 6, 7 and 8. These angle irons are formed to provide a diagonally arranged portion to which the soil engaging tools 10, 11 and 12 are attached. For this purpose the angle iron 6 is provided with a rearward diagonal portion 14 and the angle iron 7 has a forward diagonal portion 15, these portions being arranged to be secured together by bolts 16 which are also arranged to pass through the standards 18 for the soil engaging tools. The angle iron 7 is formed with a rearwardly extending and down turned end 20 to which the rear supporting wheel structure is secured, as will be described more in detail later, and the angle iron 6 is provided with a down turned end 21 which projects forwardly and to which the front supporting wheel structure is secured, as will also be described more in detail later. An angle iron 8 is bolted to the diagonal portions 14 and 15 of the frame members 6 and 7 by means of bolts 24, and a spacing block 25 is arranged between the horizontal leg of the angle iron or frame member 8 and the under surface of the diagonal portions of the frame members 6 and 7 to form a sturdy support for the rear end of the frame member 8. This frame member or angle iron 8 is also provided with a down turned forward end 26, and the forward end 21 of the frame member 6 and the end 26 of the frame member 8 are secured together by a hitch bar or plate 29 provided with one or more apertures 30 to which suitable draft or hitch connections may be secured as will be more clearly described later. The down turned ends of the frame members or angle irons 6, 7 and 8 are best shown in Figures 2 and 3.

The front end of the plow is supported on a front furrow wheel 33 which is journaled on the lateral or outer end of a pivoted stub axle or crank arm 34. This outer or laterally extended portion of the axle 34 is provided with a generally vertically arranged down turned portion 35 (see Figure 4) upon which is pivoted a sleeve 36 which carries the front furrow wheel 33 and provides a dirigible or steering mounting therefor. The sleeve 36 carries a steering arm 37 to which one end of a steering link 39 may be attached. The down turned end 35 of the stub or crank axle 34 is, in reality, the outer portion of a substantially inverted U-shaped loop 42 formed at the outer end of the axle 34, as best shown in Figures 1 and 4.

The other end of the transverse axle 34 has a longitudinally and horizontally bent portion 44 which is journaled in a U-shaped bracket 45 suitably secured to the frame member or angle iron 8 near its front end 26. In this way the laterally extending transverse crank arm or axle 34 is journaled for pivotal movement about a longitudinal axis for varying the vertical position of the forward portion of the main frame relative to the front furrow wheel 33.

The means for swinging the laterally extending crank axle 34 includes a rock shaft 47 journaled in a bracket 48 depending from and secured to the frame bar 6 and in the upper end of a vertically arranged bracket 49 bolted to the end 26 of the frame bar 8. The end of the rock shaft 47 which is supported in the bracket 48 is provided with an arm 50, preferably formed integrally with the rock shaft 47 although it may be separately formed and secured to the rock shaft if desired. The outer end of this arm is connected by a pivot bolt 52 to a link 53 which, in turn, is secured to a collar 55 fixed on the outer end of the vertically swinging transverse axle 34. Obviously, by rocking the rock shaft 47 the axle 34 is pivoted or rotated in its bracket 45 causing the outer end of the axle to move up and down and thereby raise or lower the frame relative to the front supporting wheel 33.

The swinging or rocking movement of the rock shaft 47 is counter-balanced by means of a coil spring 56 secured at one end to the diagonal portion 14 of the frame bar 6 and at the other end to an arm 57 secured in any desired manner to the rock shaft 47. In this manner the weight of the plow is counterbalanced so that no great force is required to raise and lower the frame.

The transverse crank axle 34 may, if desired, be reinforced against longitudinal stresses by means of a strut 59 connected at its outer end to the axle near or at the collar 55 and at its inner end to the rear portion of the longitudinally bent end 44 of the axle 34. During forward travel of the implement the strut 59 is normally subjected to a slight amount of compressive force, but it is to be understood that the present invention contemplates the provision of the transverse axle 34 and the reenforcing strut or brace 59 wherein the bent end of the axle 34 extends forwardly, in which case forward travel of the implement would subject the brace 59 to tensile stresses.

The rock shaft 47 is actuated by power lift means at the rear of the frame, but obviously the rock shaft may, if desired, be arranged to be operated through the usual manual lever and sector arrangement. A power lift mechanism for raising and lowering the frame of the plow to thereby raise and lower the tools is, however, preferable and in the disk plow illustrating my invention I show one form of power lift mechanism which may be utilized. The power lift arrangement will now be described.

Referring more particular to Figures 1 and 4, it will be seen that the rear end 20 of the frame bar 7 carries a journal casting indicated in its entirety by the reference numeral 60. This casting or sleeve comprises two portions 61 and 62, the portion 61 being bolted to the underside of the rear end of the frame bar 7 by bolts 63 and 64 and the other portion 62 being bolted to the portion 61 by bolts 66. The purpose of thus splitting or dividing the sleeve into two parts is to facilitate the positioning of the crank axle 70 for journal support therein.

The crank axle 70 is a U-shaped member having one section received within and carried by the sleeve 60 as just described and another section upon which the rear furrow wheel 71 is journaled. An intermediate portion 72 extends in a generally longitudinally direction and serves to connect the two sections of the crank axle 70 just described.

The swinging of the crank axle 70 to raise and lower the plow is controlled through a conventional clutch mechanism 76 associated with the rear furrow wheel 71. The clutch mechanism 76 per se forms no part of the present invention and it will therefore not be necessary to describe the same in detail. It suffices to note that the clutch mechanism 76 is of the automatic half revolution type and includes a pair of operating members 77 and 78 which when released causes the rear furrow wheel 71 to be momentarily locked to the crank axle 70 whereby upon further advance of the plow the crank axle is rocked downwardly and rearwardly to thereby raise the rear end of the frame. In the illustrated embodiment the power lift mechanism is arranged to be put to operation by a suitable latch lever 80 which is connected, as by pivot means 81, to an arm 83 preferably formed integrally with the crank axle 70. For the purpose of pivotally receiving the latch lever 80 and positioning the same to control the operating members 77 and 78 the arm 83 is provided with an inwardly bent extension 85 on the end of which the latch lever is pivoted. A cable 86 or other operating means is associated with the upper end of the latch lever 80 and is operative, when given a forward pull, to swing the lever 80 and release the operating member 78 to cause the power lift mechanism to raise the frame.

This rocking movement of the crank axle 70 is utilized to simultaneously rock the rock shaft 47 journaled at the front of the frame as described above. A suitable link or other motion transmitting connections are utilized for this purpose and from Figure 3 it will be seen that this link 90 is connected at its rear end to an arm 91 bolted to the arm 83 on the crank axle 70. To achieve this connection the rear end of the link may have a right angle bend 93 which is received within an aperture in the upper end of the arm 91 and secured therein by any suitable means, such as a cotter key.

The forward end of the link 90 is threaded and is adjustably secured, as by a pair of lock nuts 95, to a U-shaped tie member 97, the forward ends of which are swiveled to a traveling nut 99 threaded on a screw 100 mounted for rotating movement and positioned generally radially with respect to the rock shaft 47 in a casting 102 which is fixedly secured to the rock shaft 47, as by clamping means which comprises a pair of split sections formed to engage the rock shaft 47 and to be clamped thereagainst, as by bolts 104 in conjunction with a key of any suitable form. By virtue of this construction rocking of the rear crank axle 70 swings the link 90 forwardly and thereby causes the partial rotation of the rock shaft 47, the arm 50 of which thereupon swings the outer end of the transverse crank axle 34 a corresponding amount.

As best shown in Figure 3 the screw 100 is arranged at an oblique angle with respect to the link 90 when the soil engaging tools are in operative position. By virtue of this construction, therefore, rotation of the screw 100 will cause the traveling nut 99, which is slidably mounted in the casting 102, to swing the casting 102 and therefore rock the shaft 47 with respect to the crank axle 70 which is maintained in a given position. This rocking movement of the rock shaft 47 is therefore effective to raise or lower the front end of the frame without effecting the rear end, and hence this movement may be utilized to effect a leveling of the front end of the plow. For the purpose of operating the screw 100 I provide a control crank 108 which extends forwardly at one end and is connected at the other end to a universal joint 109. This universal joint is journaled in a portion of the casting 102 and includes a short shaft to which one gear of a pair of beveled gears 110 is secured, the other bevel gear being pinned or otherwise secured to the rotatable screw 100. Turning the control crank 108 causes a rotation of the screw 100 thereby rocking the rock shaft 47 independently of the operation of the lifting mechanism at the rear.

It was described above how the power lift mechanism 76 is operative to swing both the crank axles 70 and 34. I shall now describe the leveling adjustment which controls the operating depth and which is associated with the power lift mechanism at the rear. A notched sector 120 is fixed to the rear end of the frame bar 7, preferably by means of the bolts 63 and 64 which secure the upper section 61 of the journal sleeve 60 to the frame bar 7, although other bolts or similar means may be utilized if desired. A depth adjusting lever 121 is pivoted, as at 122, to the sector 120 and this lever carries a usual detent mechanism 123 which cooperates with notches on the sector 120. A lifting link 125 is connected at its lower end to the power lift mechanism 76 and at its upper end to the depth adjusting lever 121. This lifting link 125 extends through a longitudinal slot 126 (Figure 3) in the upper section 61 of the journal sleeve casting 60 and through a slot 127 (Figure 4) in the rear end of the frame member 7, the two slots being aligned.

From Figure 3 it will be observed that the lower end of the lifting link 125 is provided with two holes 130 and 131 while at the upper end this link is provided with a hole 132 and an elongated slot 133. As shown in Figure 3 the connection between the depth adjusting lever 121 and the link 125 is by means of a bolt or pin 136 which passes through the slot 133 and an opening in the depth adjusting lever 121 and the lower end of the lifting link 125 is connected to the power lift mechanism by suitable means received in the upper hole 131.

When arranged in this manner the rear furrow wheel 71 is capable of free floating movement up and down with respect to the frame of the plow to an extent permitted by the slot 133. Under certain operating conditions this floating movement of the rear furrow wheel may be a desirable characteristic. On the other hand, under other operating conditions it may be desirable to add to the frame the weight of the rear wheel and associated power lift mechanism. This may be done by simply removing the lifting link from the depth adjusting lever 121 and replacing it with the bolt 136 in the opening 132 of the lifting link 125 and securing the lower end of the link 125 to the power lift mechanism through the lower opening 130. In this way the rear wheel 71 will be locked to the frame for vertical movement therewith.

In either arrangement, whenever the lever 80 is tripped the power lift arrangement is placed in operation and causes the rear furrow wheel 71 to be momentarily locked to the swinging crank axle 70 which then, as described, swings downwardly and rearwardly and by virtue of the link 90 and associated structure the forward crank axle 34 is given a corresponding vertical movement. In this connection it is to be noted that when the crank axle 70 is rocked downwardly and the link 90 is shifted forwardly to rock the rock shaft 47, the casting 102 and the rotatable screw 100 extends in substantially perpendicular relationship to the link 90 and the tie member 97. This has the important advantage of always raising the front end of the plow the same amount regardless of what particular position the traveling nut 99 may have on the screw 100 as a result of any particular adjustment of the front wheel relative to the rear wheel. In this way both ends of the plow are always brought to the same height and raised regardless of the depth adjustment of the front wheel.

From Figure 1 it will be observed that the rear furrow wheel 71 is mounted directly in rear of one of the soil engaging tools and substantially in the median longitudinal plane of the implement, and this wheel therefore supports the main portion of the weight of the rear end of the implement. That portion of the weight of the rear end of the plow not supported by the rear furrow wheel 71 is carried on a wheel 145 journaled on the horizontal portion 146 of a third swinging crank axle 147. Unlike the swinging crank axle 34 and the crank axle 70, the axle 147 swings from one side of the plow to the other about a generally vertical pivotal axis, as best shown in Figure 4. For this purpose the axle 147 has a vertical spindle portion 149 journaled in a sleeve 150 in the form of a casting bolted to an auxiliary bracket or bar 153 which serves as an auxiliary frame member. This bar 153 is bolted at its forward end to the frame bars 6 and 7 by means of the rear pair of bolts 16 which secure the frame bars 6 and 7 and the rear standard 18 together, as best shown in Figure 1. The rear end of the auxiliary frame bar 153 is bolted to an upstanding lug 155 on the sleeve 60, preferably on the upper section 61 thereof.

The horizontally swinging crank axle 147 is arched upwardly, as at 156, so that it may be freely swung from the position shown in full lines in Figure 4 to the position shown in dotted lines, see Figures 1 and 4. In this way, therefore, the rear wheel 145 is reversible from one side of the plow to the other and is so arranged that the plow may be operated close to obstructions, plant rows and the like irrespective of whether it is desired to throw the dirt toward the plant rows or away from them. For example, if it is desired to throw soil away from the trees the wheel 145 is arranged as shown in full lines in Figures 1 and 4, so that the plow can be operated with its left side up close to the trees. If, on the other hand, it is desired to throw soil up close to the trees the wheel 145 is swung to the position shown in dotted lines in Figures 1 and 4.

The axle or crank arm 147 and the wheel 145 are adapted to be held in either position by means of an adjustable link or brace member 160. This member comprises two pipe sections 161 and 162, the section 162 having a short rod 163 fixed thereto and projecting for telescoping movement into the forward end of the other section 161. A pair of brackets 165 and 166 are fixed respectively to sections 161 and 162, and a rotatable screw 168 is fixed for rotation in one of the brackets, preferably bracket 166, and threadedly engages the other bracket 165 so that the effective length of the bracing member or link 160 may be adjusted. The rotation of the screw 168 is controlled by means of a control member 169 connected at its rear end to the screw 168 by means of a universal joint 170 and having at its forward end a crank 172, see Figure 3, by which the control member 169 may be actuated.

By rotating the crank 172 the sections 161 and 162 may be brought closer together or moved farther apart to properly position the wheel 145 with respect to the line of advance. The forward end of the section 162 is secured to the frame bar 6 by means of an apertured bracket 174 fixed preferably to the diagonal portion 14 of the frame bar 6 and the rear end of the section 161 has a down turned end which is received in one of the apertures in a collar 175 secured to the crank axle 147 near the wheel 145. The purpose of arching the reenforcing brace or link member 160 upwardly, as shown in Figure 3, is to have this member clear the frame of the plow when holding the rear wheel 145 in its position in dotted lines in Figures 1 and 4. The link 160 must also clear the link 90 when the former is swung to its dotted line position. Both of these links 90 and 160 are arranged, however, so as to lie closely adjacent the upper portion of the frame of the plow so that the implement may be operated under low overhanging limbs of trees and the like.

When operating the plow to throw the soil away from the trees or other plant rows, the wheel 145 is positioned as shown in full lines in Figures 1 and 4, as explained above. In this position, as best shown in Figure 1, there is nothing on the left hand side of the plow to prevent operating the plow as close to the trees as may be desirable. In this position, the wheel 145 rides upon plowed ground while the front wheel 33 rides in the previously opened furrow.

When the plow is operated to throw the plowed soil toward the trees, the section 161 of the brace member 160 is disconnected from the axle 147 by merely disengaging it from the apertured collar 175. The wheel 145 and axle 147 are then swung to the position shown in dotted lines in Figures 1 and 4 and the section 161 is reconnected to the collar 175 on its new position. With the wheel 145 in its dotted line position there is nothing on the right hand side of the plow to prevent its being operated close to the trees or other plant rows so as to throw the soil up as close to them as may be desired.

Under certain operating conditions certain types of disk plows or tillers may tend to veer off toward the unplowed soil rather than to hold to its work. In order to offset this tendency should it arise in this implement, I have provided in the above described disk plow a novel and improved hitch device which is best shown in Figure 5. This hitch device comprises a longitudinally extending draft bar 180 which is pivoted for swinging movement about a vertical pivot 181 and a horizontal pivot 182. The means establishing these pivots comprise a clip 184 bolted in adjusted position to the forward edge of the hitch bar 29. At its front end the draft bar 180 is provided with a hole or other means by which it may be secured to a tractor or other draft means. Forward of the pivot point 181 the draft bar 180 is provided with a number of holes 187. A bolt 188 is positioned in one of these openings and serves as a means for connecting the forward end of the steering link 39 to the draft bar 180. The rear end of the steering link 39 is connected to the steering arm 37 on the front wheel spindle 36. If desired the steering link 39 may be formed in two parts adjustably secured together. In connection with these hitch parts I provide a spring pressed toggle mechanism for yieldingly restraining pivotal movement of the draft bar 180 toward the right with respect to the hitch plate 29 and thereby preventing the plow from veering off toward the left.

As best shown in Figure 5, this toggle mechanism includes a pair of toggle links 191 and 192 pivotally connected together by a bolt or pin 193. The toggle link 191 is of U-shaped cross section and is connected to the hitch plate 29 by means of a clip 194, identical for all practical purposes with the clip 184 described above, which establishes a vertical pivot 195 and a horizontal pivot 196 for the rear end of this link. The toggle link 192 is connected at its forward end to the draft bar 180 by means of the bolt or pin 188, the forward end of the link 192 having a slot 198 which embraces the bolt 188. A coil spring 200 is secured at one end to the clip 184, or it may be secured directly to its plate 29, and at its other end the coil spring 200 is secured to the rear toggle link 191. As shown in Figure 5 this spring urges the toggle links 191 and 192 toward their straight line position, that is, with the pivots 195, 193 and 188 in alignment. In order, however, to prevent exact alignment of these pivots and to hold the toggle links so that they may be broken outwardly, I provide stop means in the form of an adjustable cap screw 204 mounted in the forwardmost end of the rear toggle link 191 and adapted to contact with the other toggle link 192 in advance of the pivot 193 which connects these toggle links. The stop means 204 is so adjusted that the toggle members or links 191 and 192 are almost but not quite in a straight line. While arranged in this way these members form a substantially rigid connection between the draft bar 180 and the hitch plate 29 and effectively resist swinging movement of the draft bar 180 toward the right and side of the implement which corresponds to the movement these parts take when the implement veers off toward the left. The degree to which the pivot points 195, 193 and 188 approximate a straight line is determined by the adjustment of the cap screw 204.

During normal operation of the plow the draft bar 180 has free pivotal movement about the vertical pivot 181 within the limits of the slot 198. The toggle connection is sufficiently rigid, due to the fact that the pivots 195, 193 and 188 are almost in line, to hold the front end of the plow against veering toward the left. If, however, the operator wishes to turn to the right and therefore turns the tractor or other draft source in that direction, sufficient force is exerted to break the toggle against the action of the coil spring 200 whereupon the toggle links take the position shown in dotted lines. Due to the fact that once the toggle is broken the effective lever arm of the draft bar 180 against the force of the spring 200 is materially increased, the draft bar 180 has free pivotal movement about its pivot 181 after it has been swung to the right a small amount. Obviously, the dimensions of the slot 198 may be varied according to the amount of swinging of the draft bar 180 toward the left which may be desired.

While I have shown and described above the preferred structural embodiment of the features of the present invention, it is to be understood that my invention is not to be limited to the specific means shown and described but that, in fact, widely different means may be employed in the practice of the broader aspects of my invention which are defined in the appended claims.

What I claim, therefore, and desire to secure by Letters Patent is:

1. A disc plow comprising, in combination, a supporting frame having a downwardly turned front end, furrow openers mounted thereon, a front furrow wheel near the forward end of said frame, bracket means connected with said down-turned end, and an axle disposed below said frame and pivotally connected with said bracket means for connecting said wheel with the frame for movement about a horizontal axis.

2. A disc plow comprising, in combination, a supporting frame, soil engaging discs carried thereby, an arm pivoted to said frame below the upper part thereof and near the forward end and movable about a substantially longitudinal axis, said arm including an end extending substantially horizontally from said longitudinal axis, a supporting wheel journaled on the laterally extended end of said arm, and depth adjusting means for the front end of said frame including means to swing said arm vertically.

3. An agricultural implement comprising, in combination, a supporting frame, soil engaging tools carried thereby, a vertically adjustable front wheel for the frame, a support for the wheel comprising a vertically swinging arm extending laterally of the frame and having at one end a longitudinal bearing portion pivotally connected with the front portion of the frame and at its outer end a vertically extending loop forming a spindle on which said front wheel is journaled, means for adjusting the vertical position of the outer end of said arm, and adjustable wheeled supporting means for the rear portion of said frame.

4. A disk plow for orchard work and the like comprising, in combination, a supporting frame including cooperating frame bars having down turned ends at the front and rear, at least one furrow opener on the frame, a laterally extending crank arm pivoted to the forward down turned ends of the frame and provided with a vertically extending spindle at its outer end, a front furrow wheel journaled thereon, and a longitudinally extending crank arm pivoted to the rear down turned ends of the frame, a rear furrow wheel journaled on the end of said second crank arm, and means arranged to swing said crank arms together.

5. A disk plow of the character described comprising, in combination, a supporting frame comprising a plurality of connected bars having down turned ends and a diagonally extending portion, a plurality of disks connected to said diagonal portion of the frame, a crank arm pivoted at one end to the front end of the frame to swing vertically about a longitudinal axis, a front furrow wheel journaled on the other end of said arm, a second crank arm pivoted to the rear of said frame and adapted to swing vertically, a rear furrow wheel journaled on the swinging end of said second crank arm, fore and aft link means connecting said swinging crank arms to cause them to swing together to raise and lower the frame, and counterbalanced means to swing the forward crank arm relative to the rear crank arm.

6. A disk plow of the character described comprising, in combination, a supporting frame comprising a plurality of connected bars having down turned ends and a diagonally extending portion, a plurality of disks connected to said diagonal portion of the frame, a crank arm pivoted at one end to the front end of the frame, a front furrow wheel journaled on said crank arm, one of said frame bars extending rearwardly, a bracket bolted to said bar, a bearing sleeve secured to said bar and bracket and extending transversely of the frame, a second crank arm pivotally supported in said sleeve and adapted to swing vertically, a rear furrow wheel journaled on the swinging end of said second crank arm, fore and aft link means connecting said swinging crank arms to cause them to swing together to raise and lower the frame, and power lift means associated with said rear furrow wheel for swinging said crank arms.

7. A disk plow of the character described comprising, in combination, a supporting frame comprising a plurality of connected bars having down turned ends and a diagonally extending portion, a plurality of disks connected to said diagonal portion of the frame, a crank arm pivoted at one end to the front end of the frame, a front furrow wheel journaled on said crank arm, one of said frame bars extending rearwardly, a bracket bolted to said bar, a bearing sleeve secured to said bar and bracket and extending transversely of the frame, a second crank arm pivotally supported in said sleeve and adapted to swing vertically, a rear furrow wheel journaled on the swinging end of said second crank arm, fore and aft link means connecting said swinging crank arms to cause them to swing together to raise and lower the frame, a second bearing sleeve vertically positioned on said bracket, a crank arm having one end journaled in said second bearing sleeve and extending laterally, a rear supporting wheel journaled on the outer end of said last named crank arm, and means fixing the last named crank arm to said frame and comprising means connecting the outer end of the crank arm with the frame, said connecting means arranged to permit said crank arm to extend from either side of the frame.

8. A disk plow of the character described comprising, in combination, a supporting frame comprising a plurality of connected bars having down turned ends and a diagonally extending portion, a plurality of disks connected to said diagonal portion of the frame, a crank arm pivoted at one end to the front end of the frame to swing vertically about a longitudinal axis, a front furrow wheel journaled on the other end of said arm, a second crank arm pivoted to the rear of said frame and adapted to swing vertically, a rear furrow wheel journaled on the swinging end of said second crank arm, fore and aft link means connecting said swinging crank arms to cause them to swing together to raise and lower the frame, said link means including a manually adjustable portion arranged to swing the forward crank arm relative to the rear crank arm and to raise the frame relative to the wheels to substantially the same height irrespective of the position of said adjustable portion.

9. A disk plow of the character described comprising, in combination, a supporting frame comprising a plurality of connected bars having down turned ends and a diagonally extending portion, a plurality of disks connected to said diagonal portion of the frame, a crank arm pivoted at one end to the front end of the frame to swing vertically about a longitudinal axis, a front furrow wheel journaled on the other end of said arm, a second crank arm pivoted to the rear of said frame and adapted to swing vertically, a rear furrow wheel journaled on the swinging end of said second crank arm, means for swinging the second crank arm to raise the frame, a link connected near one end with one of said crank arms and extending longitudinally of the frame, and means connecting the other end of said link with the other of said crank arms comprising a rock shaft connected to raise and lower said other crank arm, a radially extending rotatable screw journaled on the rock shaft, and a traveling nut on the screw to which said other end of the link is connected, said rotatable screw being arranged to be positioned substantially normal to said link when the frame is raised.

10. A disk plow of the character described comprising in combination, a supporting frame comprising a plurality of connected bars having down turned ends and a diagonally extending portion, a plurality of disks connected to said diagonal portion of the frame, means supporting the forward end of the frame, one of said frame bars extending rearwardly, a bracket bolted to said bar, a bearing sleeve secured to said bar and bracket and extending transversely of the frame, a U-shaped crank arm having one portion journaled for swinging movement in said bearing sleeve, a rear furrow wheel journaled on the swinging portion of said crank arm, and power lift means associated with the rear wheel.

11. An agricultural implement comprising a disk plow having a supporting frame including a plurality of frame bars, a vertical bearing sleeve secured to the bars near one end of the frame, a horizontal swinging crank arm having a turned end journaled in the bearing sleeve and a supporting wheel journaled near the other end, and adjustable means for holding said crank arm in a laterally extending position on either side of the plow.

12. An agricultural implement comprising a disk plow having a supporting frame including a plurality of frame bars, a swinging axle having a downturned end pivotally connected with said frame for movement in a horizontal plane and adapted to extend outwardly of the frame, brace means comprising a pair of telescoping members one connected near the outer end of the axle and the other to said frame at a point spaced from the pivot axis of said axle, and means for adjusting the effective length of said brace means.

13. An agricultural implement comprising, in combination, a supporting frame, a soil engaging tool carried thereby, front and rear supporting wheels for the frame, one of said rear supporting wheels being mounted directly in rear of said tool, means for adjusting said wheels, and a swinging axle for the other of said rear wheels including an arched portion adapted to clear said one rear wheel and the adjusting means therefor and arranged to optionally position said other rear wheel on either side of said tool.

14. An argicultural implement comprising, in combination, a supporting frame, a soil engaging tool carried thereby, front and rear supporting wheels for the frame, a hitch bar connected to the forward portion of the frame, a draft bar pivoted to said hitch bar for lateral pivotal motion in both directions, and biased means restraining said pivotal motion in one direction until the biasing force is overcome.

15. In combination, a hitch bar, a draft bar pivoted thereto for lateral swinging, a pair of toggle links pivotally connected together, one being connected to the hitch bar and the other to the draft bar, means urging said links toward alined position, and a stop arranged to prevent said toggle links from moving into alinement so that the draft bar may be swung toward said links after the force of said means is overcome.

16. An agricultural implement comprising a frame, a plurality of soil engaging tools carried thereby, a front dirigible supporting wheel, an axle therefor comprising a laterally extending vertically swinging bar pivoted to the frame for movement about a longitudinal axis, a rock shaft journaled on the frame and arranged to raise and lower the outer end of said axle, a rear wheel positioned in rear of said tools, a vertically swinging crank axle journaled on the frame and carrying said rear wheel, a fore and aft link extending along the top of the frame and connected to swing said crank axle, adjustable means connecting the forward end of said link to said rock shaft, a reversible axle pivoted to the rear portion of the frame and arranged to be swung to either side of the frame, a second rear wheel journaled on the outer end of said reversible axle, adjustable means securing the reversible axle in position on either side of the frame, operating means therefor operable from the forward portion of the implement, a hitch bar at the forward end of the frame, a draft bar pivoted thereto, link means connecting the dirigible front wheel with said draft bar, and means yieldingly restraining relative pivotal movement between the draft bar and the hitch bar in one direction.

17. An agricultural implement comprising, in combination, a supporting frame, said frame comprising a pair of angle irons having downturned ends and diagonally arranged portions, means securing the diagonal portions together so that one of said downturned ends is at the forward end of the implement and the other is at the rear, soil engaging tools carried by said diagonal portions, a forwardly extending angle iron, wheeled supporting means carried by said forwardly extending angle iron and said forward downturned portion, and a rear furrow wheel journaled on said rear downturned end.

18. An agricultural implement comprising, in combination, a supporting frame, an axle having one end hinged to said frame and movable about a horizontal axis, the other end of said axle formed to provide a vertical spindle, a supporting wheel mounted on said vertical spindle, and means for controlling the relative angular position of said wheel about said vertical spindle.

19. An agricultural implement comprising, in combination, a supporting frame, a furrow opener secured thereto, an axle having one end journaled on said frame for movement about a horizontal axis, the other end of said axle being formed to provide a vertical spindle, and supporting means for the plow including a dirigible wheel mounted for lateral swinging on said vertical spindle.

20. An agricultural implement comprising, in combination, a supporting frame, a soil engaging tool carried thereby, at least two rear supporting wheels for the frame, one of said wheels being disposed laterally of the frame and between the longitudinal confines of said tool, and means optionally connecting the other rear wheel to the frame to dispose the other wheel at either side thereof.

21. An agricultural implement comprising, in combination, a supporting frame, a soil engaging tool carried thereby, front and rear supporting wheels for the frame, a draft bar pivoted to the front end of the frame for lateral pivotal motion in both directions, and biased means restraining said pivotal motion in one direction until the biasing force is overcome.

22. In combination, a frame, a draft bar pivoted thereto for lateral swinging, a pair of toggle links pivotally connected together, one being connected to the frame and the other to the draft bar, means urging said links toward alined position, and a stop arranged to prevent said toggle links from moving into alinement so that the draft bar may be swung toward said links after the force of said means is overcome.

23. An agricultural implement comprising, in combination, a supporting frame, a vertically adjustable front wheel for the frame, a support for the wheel comprising a vertically swinging arm having at one end a longitudinal bearing portion pivotally connected with the front portion of the frame and at its outer end a vertically extending loop forming a spindle on which said front wheel is journaled, and means for adjusting the vertical position of the outer end of said arm.

24. An agricultural implement comprising, in combination, a supporting frame, a horizontally extending vertically swinging arm pivoted at one end to the frame for movement about a horizontal axis, said arm including an elongated horizontally extending portion with means at the outer end thereof providing a vertical spindle, and a supporting wheel carried by said vertical spindle.

25. An agricultural implement comprising, in combination, a supporting frame, a laterally extending vertically swinging arm pivoted at one end to the frame for movement about a substantially horizontal axis, said arm including an elongated portion extending laterally from said axis beyond the frame and terminating in a vertically disposed spindle portion rigidly carried thereby, and a supporting wheel journaled on said spindle portion.

26. An agricultural implement comprising, in combination, a supporting frame, a soil engaging tool carried thereby, front and rear supporting wheels for the frame, a swinging crank axle connecting one of said rear supporting wheels with the frame and including an axle portion journaled on the frame and a journal portion for receiving said one rear wheel, and a horizontally swinging axle for the other of said rear wheels, said horizontally swinging axle including a vertical portion pivotally connected with said frame for movement about a substantially vertical axis, and an arched portion adapted to clear said one rear wheel when swung to one position with respect to said supporting frame, said horizontally swinging axle being arranged to optionally position said other rear wheel on either side of said soil engaging tool.

27. An agricultural implement comprising in combination, a supporting frame, a soil engaging tool carried thereby, front and rear supporting wheels for the frame, a swinging crank axle connecting a transversely disposed crank portion journaled on the frame and a forwardly disposed journaled portion for receiving one of said rear supporting wheels, and a horizontally swinging axle for the other of said rear wheels, said horizontally swinging axle being connected with said supporting frame for movement about a vertical axis disposed forwardly of the crank portion of said swinging crank axle and rearwardly of the journal portion thereof, said horizontally swinging crank axle also including an upwardly arched intermediate portion to clear said one rear wheel when the said horizontally swinging axle is arranged in one transverse position with respect to the supporting frame.

In witness whereof, I hereunto subscribe my name this 7th day of April, 1931.

WILLIAM L. PAUL.